United States Patent [19]
Rosenberg et al.

[11] Patent Number: 5,313,736
[45] Date of Patent: May 24, 1994

[54] FLEXIBLE LINE COUPLING METHOD AND APPARATUS

[76] Inventors: Howard Rosenberg, 3661 State Rd. 84, Fort Lauderdale, Fla. 33312; Eric Kuritzky, 346 E. Kaley St., Orlando, Fla. 32806

[21] Appl. No.: 962,742

[22] Filed: Oct. 19, 1992

[51] Int. Cl.$^5$ .................................... A01K 91/04
[52] U.S. Cl. ........................... 43/44.83; 43/43.16
[58] Field of Search ............... 43/43.16, 44.82, 44.83; 289/1.2, 1.5

[56] References Cited

U.S. PATENT DOCUMENTS

| | | | |
|---|---|---|---|
| 103,645 | 5/1870 | Muscroft | 43/44.83 |
| 2,222,277 | 11/1940 | Baker | 43/44.83 |
| 2,616,206 | 11/1952 | Ammon | 43/44.83 |
| 2,847,220 | 8/1958 | Heffron | 43/44.83 |
| 4,008,912 | 2/1977 | Kotov | 289/1.2 |
| 4,905,403 | 3/1990 | Manno | 43/43.16 |

FOREIGN PATENT DOCUMENTS

| | | | |
|---|---|---|---|
| 1501057 | 10/1967 | France | 43/44.83 |
| 58-137195 | of 1983 | Japan. | |
| 65439 | 3/1942 | Norway | 43/44.83 |
| 7397 | of 1888 | United Kingdom | 43/44.83 |
| 614 | of 1909 | United Kingdom | 43/44.83 |
| 2100103A | 12/1982 | United Kingdom | 43/43.16 |

*Primary Examiner*—Kurt C. Rowan
*Attorney, Agent, or Firm*—McHale & Slavin

[57] ABSTRACT

Disclosed is a method for attaching a flexible line to a fixed object by use of an improved attachment shank. The attachment shank is based upon a one piece shank having at least three circular bends formed at one end of the shank, the free end of the shank forming a hook, clasp, or the like shape. The circular bends of the shank form a centrally disposed aperture set in a parallel plane to a centerline of the shank. Attachment of a flexible line to the shank is performed by inserting the flexible line through the aperture and reinserting a portion of the flexible line through the opposite end of the aperture. The flexible line is then twisted into at least three predefined loops engaging the circumference of the shank. Upon pulling of the line, the loops are pulled taunt about the shank tightly securing the line to the shank using the aperture as a slide preventing shoulder.

4 Claims, 2 Drawing Sheets

FIG. 1 (PRIOR ART)
FIG. 2 (PRIOR ART)
FIG. 3 (PRIOR ART)
FIG. 4A
FIG. 4B
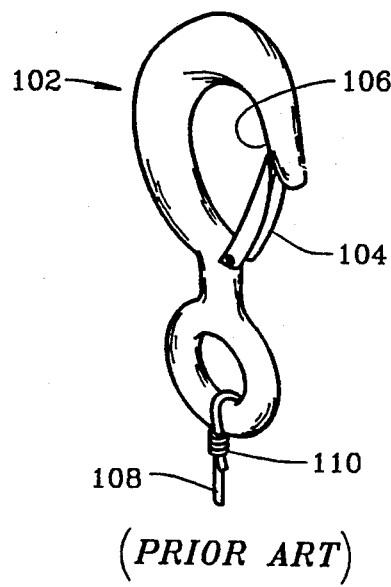
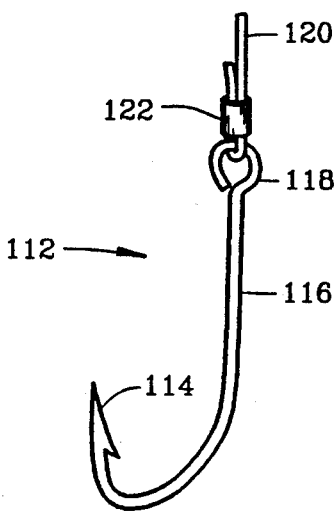
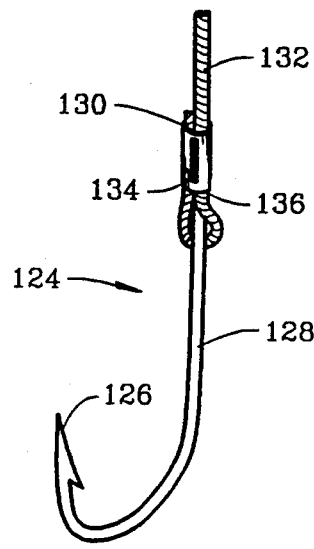
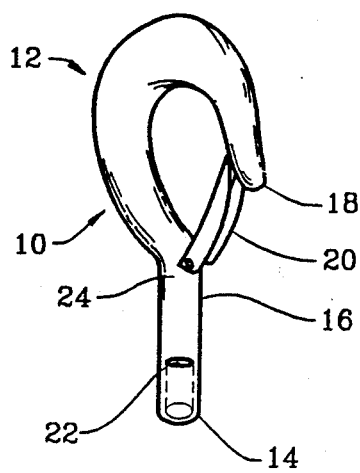
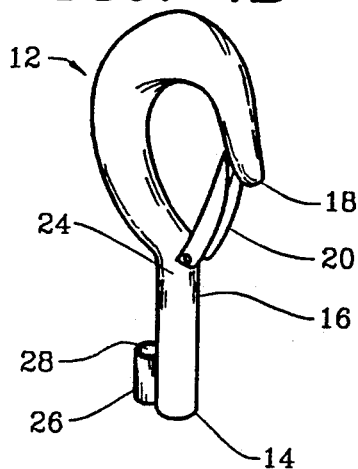

FLEXIBLE LINE COUPLING METHOD AND APPARATUS

FIELD OF THE INVENTION

The present invention relates generally to a method of attaching a flexible line to a fixed object and, more particularly, to an improved coupling method having a beneficial application for the fishing industry in permitting rapid fish line attachment.

BACKGROUND INFORMATION

The coupling of flexible lines such as wire, rope, or string to a fixed object can be performed by countless variations of ties, knots, buckles, swages, barrel compression sleeves, swivels, or combinations thereof. This temporary tethering of objects is performed by tying the line to the object, typically by use of a coupling attachment such as an eye hook. For example, boat trailers make use of an eye hook placed on the outer hull of the boat for pulling a boat onto a trailer. Similarly, automobile manufacturers provide frame tow hooks to allow pulling of the automobile if necessary. Practically every object that can be pulled uses some form of coupling attachment receptive to flexible line attachment typically accomplished by tying the flexible line into a knot. A problem with tying a flexible line to a fixed object, to which this invention is directed, occurs in the employment of conventional tethering methods consisting of knots for securing the flexible line to the fixed object. If the flexible line is improperly tied, tension placed upon the line can cause the knot to unravel leading to a catastrophic result. Further, knot tying places the stress on the end of the attachment mechanism, such as an eye bolt, as opposed to the object itself. If an attachment device is used to interface with the flexible line and the attachment device is improperly shaped, the device may cut the line at the attachment point.

A frequent use of flexible line couplings is found in the boating industry. To pull a boat onto a trailer for transportation, a winch installed on the trailer makes use of a flexible line having a line coupler tied to the end of the line. When a boat is to be pulled onto the trailer, the line coupler is used to hook the eye hook protruding from the boat. Once coupled, the winch is operated to pull the boat onto the trailer. If the line coupler is improperly tied to the flexible line, the line can slip. If the attachment device is improperly manufactured or the line size is inappropriate for the forced bend, the line can be sliced when a load is applied.

Another frequent use of knot tying is found in the sport of fishing. Fishing employs a variety of fishing hooks, lures, spoons, artificial bait, weights, and so forth tied onto the end of a fishing line. Fishing requires a fishing line to be attached to lure placed at the end of the line. The conventional method of tying the baited hook to the fishing line is by use of an eye formed at one end of the shank wherein the fishing line is tied by use of a knot or other mechanical device. If the knot is improperly tied, the bait will be lost.

Improperly tied hooks used in sport fishing of larger fish can be more than just a nuisance in replacing. For instance, competition tuna hooks are hand forged from stainless steel and are extremely expensive to replace. Further, loss of the hook typically leaves a fish with a hook attached in its mouth. Although professional operators meticulously tie each hook, if the hook is not properly manufactured the aforementioned results will be the same. Even a properly tied line can snap since the conventional method of tying requires the fishing line to form a 180 degree U-shaped bend about the curvature of the eye. Thus, if the eye is not properly rounded it can act as a sharp edge to cut the fishing line.

One known device that addresses the need for knotless tying is Japanese Patent 58-137195 issued to Kato which discloses an improved hook for tuna fishing. Kato tuna hook requires a small pipe-like member to be welded to the straight portion of the shank. Attachment of the fishing line to the tuna hook is performed by inserting the fishing line through the top portion of the small pipe, wrapping the fishing line around the shank, and reinserting the fishing line back through the bottom opening of the small pipe. The pipe is then crimped to prevent the line from sliding out of the pipe. The pipe is welded to the shank of the hook which increases the price of the hook proportionally. Further, Kato must chamfer the inner cavity of the pipe to accommodate the sharp bend resulting when the fishing line wraps around the shank.

Thus, what is lacking in the art is a method of tying a flexible line to a fixed object that can be performed without the need for welding additional components onto the coupling device, does not require the tying of a knot, and places the majority of the strain directly upon the shank of object to be pulled.

SUMMARY OF THE INVENTION

The present invention satisfies the aforementioned needs by disclosing an apparatus designed to provide knotless tying of any object with a particular use in the fishing industry. The apparatus requires the shank of the object, or upon the provision of a shank, to include an aperture having a proximal and distal end all formed in a co-planar line of the adjacent shank. The distal end which is adjacent to the body of the shank provides a shoulder, the aperture providing a centering means for directional placement of the flexible line.

Based upon the improved apparatus, the method of attaching a flexible line to the shank can be performed by the following steps: (a) inserting a leader of flexible line into and through the proximal opening of the aperture; (b) reinserting a portion of the leader of the flexible line into and through the distal opening of the aperture forming a contiguous loop depending from the distal end of the aperture; (c) twisting the loop in front of the shank to form a first loop; (d) inserting the free end of the shank through the first loop; (e) twisting the loop in back of the shank to form a second loop; (f) inserting the free end of the shank through the second loop; (g) twisting the loop in front of the shank to form a third loop; (h) inserting the free end of the shank through the third loop; (i) pulling the flexible line inserted in the proximal end causing the first, second, and third loop to conform to and frictionally engage the shank.

This apparatus and method of tying has particular benefit in the field of fishing by providing an improved fishing hook permitting ready coupling to a fishing line. The improved fishing hook is formed from a one piece shank having a first end formed into a plurality of circular bends which create the aperture. Unlike a conventional eye hook, the aperture is not required to form an impervious break but rather provides a directional feed line and works as a shoulder to prevent slippage along the longitudinal length of the shank. A second end of the shank includes a generally U-shaped bend terminating in a pointed tip. The tip may have a barb extending obliquely from at least one side of the tip or the hook can be made barbless. By tying of the fishing line in the aforementioned steps to the fishing hook, the strength of the fishing line is transferred directly to the shank of the hook providing the combination with a true pound test as rated by the fishing line.

Accordingly, a primary object of the present invention is to provide an improved method of tying that transfers the stress from the flexible line to the shank of the apparatus used for coupling.

Still another object of the present invention is to provide a one piece shank design that allows knotless coupling.

Yet still another object of the present invention is to provide an aperture that directs the positioning of a flexible line in a predefined location about the longitudinal length of a shank to provide efficient frictional engagement yet prevent line slicing and sharp stress inducing bends in the line.

Another object of the present invention is to provide a one piece inexpensive, fishing hook adaptable to knotless tying of fishing line by unskilled operators.

Another object of the present invention is to provide a triple loop attachment to provide frictional engagement along the length of a shank and eliminate the need for crimped line support.

Other objects and advantages of this invention will become apparent from the following description taken in conjunction with the accompanying drawings wherein set forth are, by way of illustration and example, certain embodiments of this invention. The drawings constitute a part of this specification and include exemplary embodiments of the present invention and illustrate various objects and features thereof.

BRIEF DESCRIPTION OF THE DRAWINGS

FIG. 1 is a side elevational view of a conventional boat snap ring hook of the prior art;

FIG. 2 is a side elevational view of a conventional fishing hook of the prior art utilizing a sleeve crimp for fishing line attachment;

FIG. 3 is a side elevational view of a Kato tuna fishing hook of the prior art;

FIG. 4A is a side elevational view of a boat snap ring having an internally placed improved line attachment end of the instant invention;

FIG. 4B is a side elevational view of a boat snap ring having an externally placed improved line attachment end of the instant invention;

DESCRIPTION OF THE PREFERRED EMBODIMENTS

Figure 5:
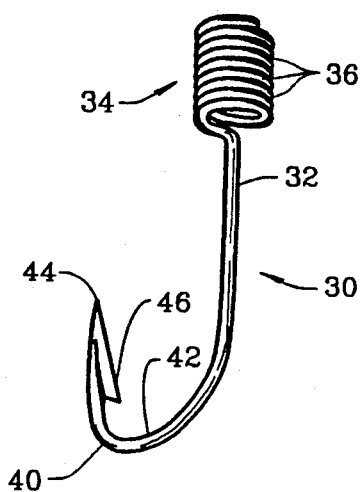
FIG. 5 is a side elevational view of a fishing hook having an improved line attachment end formed from the shank of the hook.

As required, detailed embodiments of the present invention are disclosed herein. FIGS. 1-3 set forth various flexible line attachments of the prior art wherein FIG. 1 depicts a conventional boat snap ring 102 having a flexible opening clasp 104 biasing against the inner surface 106 of the hook. Attachment of a snap hook is performed by moving clasp 104 away from the inner surface of the hook to accommodate a boat hull mounted coupling hook. Flexible line 108 is attached by wrapping line 108 around the bottom portion of the hook 102 and tying the line 108 in a knot 110. Line 108 conforms to the outer diameter of the bottom portion of the hook forcing line 108 into a U-shaped loop, the loop does not provide frictional support. For this reason knot 110 provides the sole means for maintaining line 108 attachment. If the knot 110 is improperly tied, the attachment will fail. If the bottom portion of the hook 102 is improperly shaped, the U-shape bend of the line can slice the loop portion of the line.

FIG. 2 illustrates a conventional fishing hook 112 having a sharp tip and barb 114. Shank 116 of the hook 112 forms an eye hook 118 for attachment of fishing line 120. The fishing line 120 is secured to the eye hook 118 with a barrel compression sleeve 122 which can be crimped by a pliers for maintaining line 120 attachment. FIG. 3 depicts the aforementioned Kato tuna hook 124 having a sharp tip and barb 126. The shank 128 of the tuna hook 124 forms a base wherein a small pipe 130 is welded thereto. The small pipe 130 forms an aperture therein for insertion of fishing line 132 which is wrapped about the shank 128 and reinserted into the aperture. The pipe eliminates the need for a compression sleeve simply welding a compression sleeve onto the shank of the hook. The small pipe 130 is then squeezed at crimp line 134 to frictionally engage the fishing line 132. It should be noted that even if Kato's device is sized to eliminate crimping of the pipe, the method of tying taught by Kato does not accommodate wear or stretching of the line which leads to slippage. Further, due to the sharp bending of the fishing line 132 at the bottom edge 136 of the small tube 130, Kato requires and teaches the need chamfering the small tube to prevent slicing of the fishing line 132.

Now referring to FIG. 4A, 4B and 5, shown are various embodiments of the attachment mechanism of the instant invention for use in coupling with a flexible line. It is understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

FIG. 4A illustrates a boat snap ring 10 permitting ready coupling of a flexible line. The boat snap ring 10 is formed from a one piece steel shank 12 with a first end 14 having centrally disposed aperture for direction placement of the flexible line. The second end 18 of the shank 12 terminates after formation of a hook wherein clasp 20, coupled to a portion of the shank 12, is available for biasing against an inner surface of the second end 18. The first end 14 employs an internally placed aperture 22 with sufficient shank spacing 24 to accommodate the improved method of typing described in detail later in this application.

FIG. 4B sets forth a variation of the boat snap ring for coupling of a flexible line. The boat snap ring is formed from a two piece steel shank 12 with a first end 14 having a solid shank. The second end 18 of the shank 12 terminates after formation of a hook wherein clasp 20, coupled to a portion of the shank 12, is available for biasing against an inner surface of the second end 18. The first end 14 employs an externally disposed pipe 26 having aperture 28. The shank spacing 29 accommodates the improved method of tying described in detail later in this application.

FIG. 5 depicts a fishing hook 30 constructed of steel or plastic permitting ready coupling of a flexible line. The fishing hook 30 is formed from a one piece shank 32 having a first end 34 formed into at least three circular revolutions about a centerline, side-edge, or offset of a longitudinal portion of the shank 32 to form an aperture in a parallel plane to shank 32. The aperture having a predetermined inner diameter for a range of fishing lines for the slidable insertion of a fishing line in a first direction and the frictional engagement of said fishing line upon reinsertion in the opposite direction. Once wrapped about the shank the line cannot unravel. The second end 40 of the shank 32 is formed by use of a bend 42 at the opposite end thereof terminating in a pointed tip 44 having a barb 46 extending obliquely therefrom. It should be noted that the shank 32 can also be constructed of hardened box steel, malleable steel which is hardened by heat treatment such as the exothermic reaction of cold working, or plastic.

Figure 6:
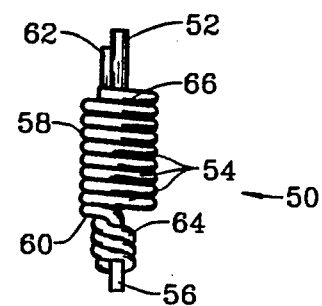
FIG. 6 is a partial view of the line attachment end of the instant invention with a line attached thereto.

FIG. 6 depicts a first end 50 similar to end 34 of FIG. 5 with a flexible line 52 attached thereto. End 50 is formed by the use of at least three full circular revolutions 54 about a centerline or offset centerline of the longitudinal portion of the shank 56 to form an aperture 66 in a parallel plane to the shank 56. The aperture 66 defined between a proximal opening 58 and a distal opening 60 available for bi-directional insertion of the fishing line 52. The fishing line 52 is first inserted into and through the proximal opening 58 of the aperture 66 with end 62 reinserted into and through the distal opening 60 of the aperture 66. After a series of predefined loops of the fishing line, the line 52 is pulled taunt pulling the line tightly against the distal opening 60. By use of off-center placement of the circular revolutions 54 of the shank 56, the fishing line 64 depending directly beneath the distal opening is set at less than a 90 degree angle, as compared to the U-shaped 180 degree bend of the prior art. The distal end 60 does not require chamfering and acts as a shoulder to the fishing line. The majority of the friction engagement is about the circumference of the shank 56 in a longitudinal form.

Figure 7A:
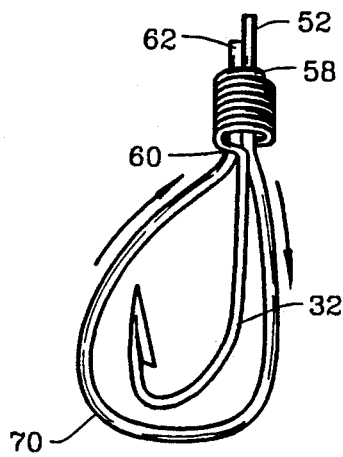
FIG. 7A-D are pictorial views of the steps required in attaching a line to the fishing hook of FIG. 5.
Figure 7B:
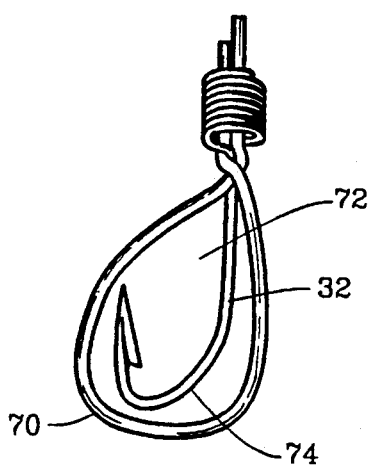
Figure 7C:
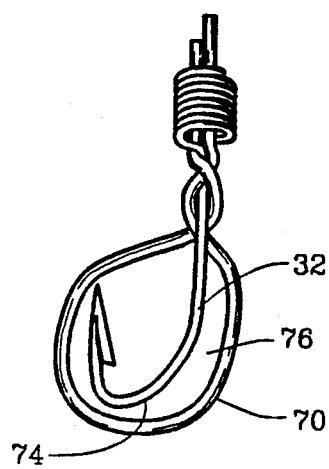
Figure 7D:
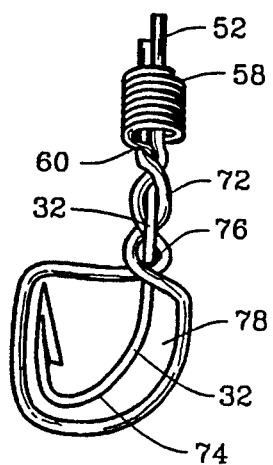

Now referring to FIGS. 7A-D the method of attaching a flexible line to a shank having an aperture, such as the fishing hook depicted in FIG. 5, is shown comprising the steps of:

(a) FIG. 7A—inserting a leader 62 of flexible line 52 into and through the proximal opening 58 of the aperture formed at one end of the shank 32;

(b) reinserting a portion of the leader 62 into and through the distal opening 60 of the aperture forming a contiguous loop 70 of fishing line 52 depending from the distal end 60;

(c) FIG. 7B—twisting the loop 70 in front of the shank 32 to form a first loop 72;

(d) inserting a defined end 74 of the shank 32 through the first loop 72;

(e) FIG. 7C—twisting the loop 70 in back of the shank 32 to form a second loop 76;

(f) inserting the defined end 74 of the shank through the second loop 76;

(g) FIG. 7D—twisting the loop 70 in front of the shank to form a third loop 78;

(h) inserting the defined end 74 of said shank through said third loop 78;

(i) pulling said flexible line 52 inserted in the proximal end 58 causing said first 72, second 76, and third 78 loop to conform to, and frictionally engage, the shank 32 resides against the shoulder.

It is to be understood that while I have illustrated and described certain forms of my invention, it is not to be limited to the specific forms or arrangement of parts herein described and shown. It will be apparent to those skilled in the art that various changes may be made without departing from the scope of the invention and the invention is not to be considered limited to what is shown in the drawings and described in the specification.

What I claim is:

1. A fishing hook permitting ready coupling of a fishing line, said fishing hook comprising: a one piece shank having a straight length with a first end formed into a spiral formation defined by at least three tightly spaced circular revolutions about a centerline of the straight length creating an aperture having an inner surface with a proximal opening disposed at one end of the aperture and a distal opening at the opposite end of the aperture, the aperture extending parallel to said centerline of the straight length for maintaining an untied portion of a fishing line in a frictionally engaged fixed position; and a second end of said shank depends downwardly from said distal opening into a U-shaped bend ending in a sharpened tip;

whereby said aperture is available for knotless tying of a fishing line by insertion of a line through the proximal end of said aperture and reinserting a portion of the fishing line into and through said distal opening of said aperture forming a loop depending from said distal end, the loop is twisted in front of said shank to form a first loop wherein the free end of said shank is inserted through the first loop, the loop is twisted to form a second loop where the free end of the shank is inserted through the second loop, the loop is then twisted in front of said shank to form a third loop wherein the free end of said shank is inserted through, whereby the fishing line inserted in said proximal end is pulled taunt to cause said first, second, and third loop to conform to, and fictionally engage, at least a portion of the straight length of said shank.

2. The fishing hook according to claim 1 wherein said shank is constructed of plastic.

3. A method of tying a fishing hook having an attachment aperture placed in a parallel plane to a shank of the fishing hook set adjacent to said attachment aperture, said method of typing comprising the steps of:

(a) inserting a leader of fishing line into and through a proximal opening of said aperture formed in the first end o said fishhook;

(b) reinserting a portion of said leader of said fishing line into and through a distal opening of said aperture forming a contiguous loop of fishing line depending from said distal end of said aperture;

(c) twisting said loop in front of said fishing hook shank to form a first loop;

(d) inserting the bend portion of said fishing hook shank through said first loop;

(e) twisting said loop in back of said fishing hook shank to form a second loop;

(f) inserting the bend portion of said fishing hook shank through said second loop;

(g) twisting said loop in front of said fishing hook shank to form a third loop;

(h) inserting the bend portion of said fishing hook shank through said third loop;

(i) pulling said fishing line inserted in said proximal end causing said first, second, and third loop to conform to, and frictionally engage, the shape of said fishing hook shank.

4. In combination with an apparatus having a shank with a defined end and an parallel placed aperture coupled to said shank, a method of attaching a flexible line to said shank in conjunction with said aperture, said method comprising:
   (a) inserting a leader of flexible line into and through a proximal opening of said aperture formed at one end of said shank;
   (b) reinserting a portion of said leader of said flexible line into and through a distal opening of said aperture forming a contiguous loop of line depending from said distal end of said aperture;
   (c) twisting said loop in front of said shank to form a first loop;
   (d) inserting the defined end of said shank through said first loop;
   (e) twisting said loop in back of said shank to form a second loop;
   (f) inserting the defined end of said shank through said second loop;
   (g) twisting said loop in front of said shank to form a third loop;
   (h) inserting the defined end of said shank through said third loop;
   (i) pulling said flexible line inserted in said proximal end causing said first, second, and third loop to conform to, and frictionally engage, the shape of said shank.

* * * * *